United States Patent
Parker et al.

(10) Patent No.: US 12,223,175 B1
(45) Date of Patent: Feb. 11, 2025

(54) CACHE WRITING TO ZONES TO MAXIMIZE WRITE BANDWIDTH

(71) Applicant: Western Digital Technologies, Inc., San Jose, CA (US)

(72) Inventors: Liam Parker, Edinburgh (GB); Alan D. Bennett, Edinburgh (GB)

(73) Assignee: Sandisk Technologies, Inc., Milpitas, CA (US)

( * ) Notice: Subject to any disclaimer, the term of this patent is extended or adjusted under 35 U.S.C. 154(b) by 0 days.

(21) Appl. No.: 18/464,503

(22) Filed: Sep. 11, 2023

(51) Int. Cl.
G06F 3/06 (2006.01)
G06F 12/0875 (2016.01)

(52) U.S. Cl.
CPC .......... G06F 3/0613 (2013.01); G06F 3/0644 (2013.01); G06F 3/0658 (2013.01); G06F 3/0688 (2013.01); G06F 12/0875 (2013.01); G06F 2212/1016 (2013.01)

(58) Field of Classification Search
None
See application file for complete search history.

(56) References Cited

U.S. PATENT DOCUMENTS

| | | | |
|---|---|---|---|
| 9,280,472 B1* | 3/2016 | Dang | G06F 12/0871 |
| 10,417,190 B1 | 9/2019 | Donlan et al. | |
| 11,061,595 B2 | 7/2021 | Shen | |
| 11,442,646 B2 | 9/2022 | Agarwal | |
| 2022/0004327 A1 | 1/2022 | Dedrick | |
| 2022/0308780 A1 | 9/2022 | Kanteti et al. | |
| 2022/0350530 A1 | 11/2022 | Yoshida et al. | |
| 2023/0051328 A1* | 2/2023 | Barczak | G06F 12/0873 |

* cited by examiner

*Primary Examiner* — Kevin Verbrugge
(74) *Attorney, Agent, or Firm* — PATTERSON + SHERIDAN, LLP (57) ABSTRACT

Instead of having all zones open across all dies, optimizing caching of non-direct write active zones using a host append point (HAP) for maximum write bandwidth is sufficient. The controller will calculate the write rate for a jumbo device (JD). Based on the JD with lowest total write rate, the controller will assign the JD a new zone. The controller will then determine whether the write rate is either appropriate for a cache write or for a direct write. Based on the determination, the controller will write data to the new zone. If the controller direct writes to the new zone, then the controller will close the zone when the zone is full. If the controller cache writes the data to the new zone, then the controller will copy the zone to the direct write area and return the cache write zone to a zone pool. The controller will reclassify the zone if the initial classification is incorrect.

20 Claims, 6 Drawing Sheets

CACHE WRITING TO ZONES TO MAXIMIZE WRITE BANDWIDTH

BACKGROUND OF THE DISCLOSURE

Field of the Disclosure

Embodiments of the present disclosure generally relate to improving die balancing and caching write active zones for maximum write bandwidth.

Description of the Related Art

Enterprise grade Data Placement (DP) solid state device (SSD) s that require an UBER better than 1 in $10^{-17}$ require internal XOR in NAND. Such drives stripe over many dies in order to minimize the amount of NAND lost to XOR. There is an upper limit due to compaction optimization in log structure merge (LSM) tree applications that have a rule of thumb maximum zone/region size of 1 GB per 1 TB capacity. This means that DP SSDs cannot stripe over all dies for optimal write performance.

Multiple zones/regions need to be open by a host to reach full write die performance. This leads to the case that zones get written at uneven speeds to the LSM hierarchy structure and metadata streams. Furthermore, the unbalanced placement of valid data across the dies leads to sub-optimal write performance. Having zones all open across all dies is a potential solution, but the issues with such an approach is that the zones are too big, which leads to poor host side garbage collection.

Therefore, there is a need in the art for improving maximum write bandwidth in SSDs.

SUMMARY OF THE DISCLOSURE

Instead of having all zones open across all dies, optimizing caching of non-direct write active zones using a host append point (HAP) for maximum write bandwidth is sufficient. The controller will calculate the write rate for a jumbo device (JD). Based on the JD with lowest total write rate, the controller will assign the JD a new zone. The controller will then determine whether the write rate is either appropriate for a cache write or for a direct write. Based on the determination, the controller will write data to the new zone. If the controller direct writes to the new zone, then the controller will close the zone when the zone is full. If the controller cache writes the data to the new zone, then the controller will copy the zone to the direct write area and return the cache write zone to a zone pool. The controller will reclassify the zone if the initial classification is incorrect.

In one embodiment, a data storage device comprises: a memory device; and a controller coupled to the memory device, wherein the controller is configured to: open a zone in a zoned namespace (ZNS) drive, wherein the zone has an estimated write rate equal to the write rate of a most recently closed zone; calculate a total write rate for each jumbo device of a plurality of jumbo devices, wherein each jumbo device includes a plurality of zones; and place the opened zone in a jumbo device having a lowest total write rate.

In another embodiment, a data storage device comprises: a memory device; and a controller coupled to the memory device, wherein the controller is configured to: classify newly opened zones based upon write rate, wherein the classifying comprises placing the newly opened zones into either a direct write classification or a cache write classification; write data to the newly opened zones; determine that at least one zone of the newly opened zones is misclassified; close another zone; and reclassify the at least one zone.

In another embodiment, a data storage device comprises: means to store data; and a controller coupled to the means to store data, wherein the controller is configured to: estimate a write rate for newly opened zones; categorize the newly opened zones based upon the write rate; analyze correctness of the categorizing after beginning a write process; and re-categorize the newly opened zones after beginning the write process and before filling the newly opened zones.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

Instead of having all zones open across all dies, optimizing caching of non-direct write active zones using a host append point (HAP) for maximum write bandwidth is sufficient. The controller will calculate the write rate for a jumbo device (JD). Based on the JD with lowest total write rate, the controller will assign the JD a new zone. The controller will then determine whether the write rate is either appropriate for a cache write or for a direct write. Based on the determination, the controller will write data to the new zone. If the controller direct writes to the new zone, then the controller will close the zone when the zone is full. If the controller cache writes the data to the new zone, then the controller will copy the zone to the direct write area and return the cache write zone to a zone pool. The controller will reclassify the zone if the initial classification is incorrect.

Figure 1:
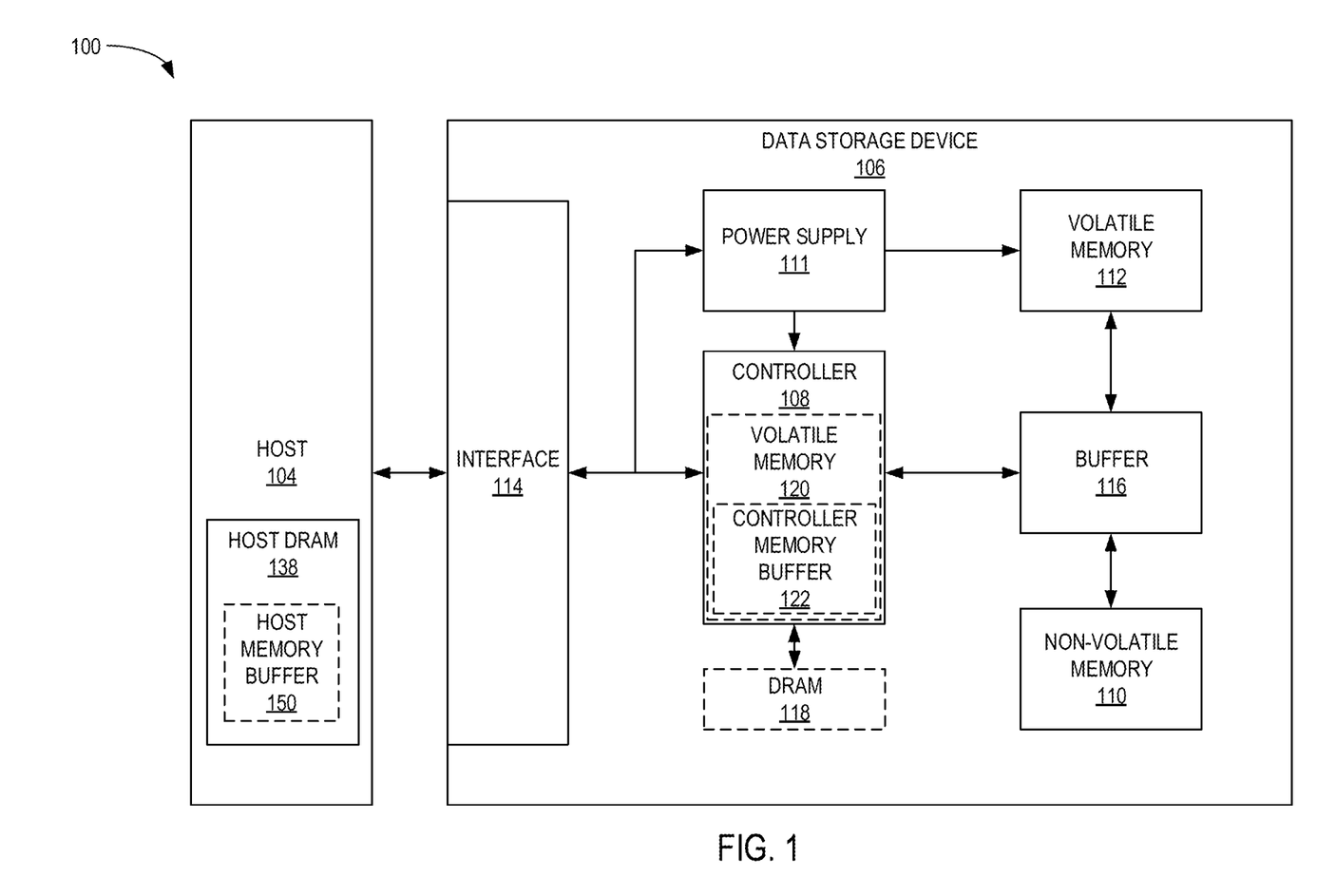
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host dynamic random access memory (DRAM) 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
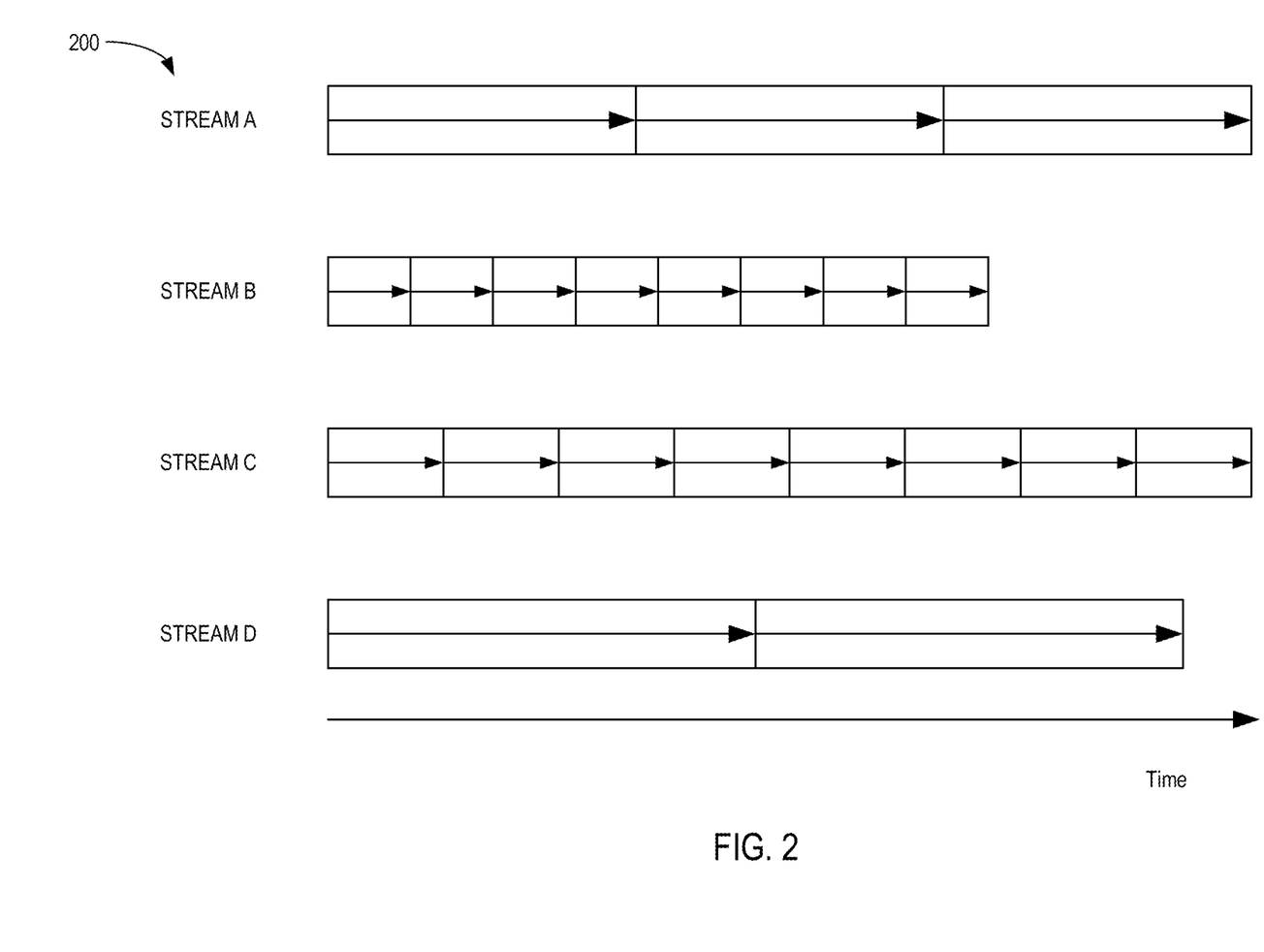
FIG. 2 is a block diagram illustrating a system of fast and slow streams, according to one embodiment.

FIG. 2 is a block diagram illustrating a system 200 of fast streams and slow streams, according to one embodiment. The system 200 has a Stream A, Stream B, Stream C, and Stream D. Each of the streams are writing to each zone of a JD for flexible data placement (FDP). For each stream to effectively write, the controller measures the rate at which each zone on a die is filling up and then balancing the DP. The issue with the process is that the controller cannot tell where the streams are written to. The controller is not notified of the location to write to until the host starts writing what rate the streams are for the open zones in a zoned namespace (ZNS). The controller tracks the rate of all of the open zones until the user gets to the end of the zone or reclaim unit.

The stream then opens a new reclaim unit or zone. Whenever a zone is reopened, the user assumes that the zone is going to be written at the speed of the zone that just most recently closed. Newly opened zones are assigned an initial estimated write rate of the most recently finished zone. An open zone is a dedicated jumbo block (JB) receiving a stream of host writes. Upon opening a new zone, total write rate (TWR) is calculated for each JD (the sum of write rates for all zones writing to that JD). A JD is a set of dies in an SSD that will be used to create JBs. The JDs are sorted by their TWR. The controller can then calculate which die to open the zone on to balance the speed at which writing occurs and the fullness of each of the dies. All dies should be relatively evenly filled.

All open zones have their rate of writing tracked. Zones are ordered in a sorted list by rate of writing (host write speed). Zones are utilized by the host system by opening new zones as old zones fill. In some cases, a zone is opened on the JD with the lowest TWRJD. A JD may have slightly different amounts of free space due to several reasons. One such reason is a variation in the number of good blocks across a die. An additional reason can be that there is a failed die in one of the JDs. Another reason is the host resetting zones (deallocate) in a pattern that causes an imbalance in free space.

Figure 3:
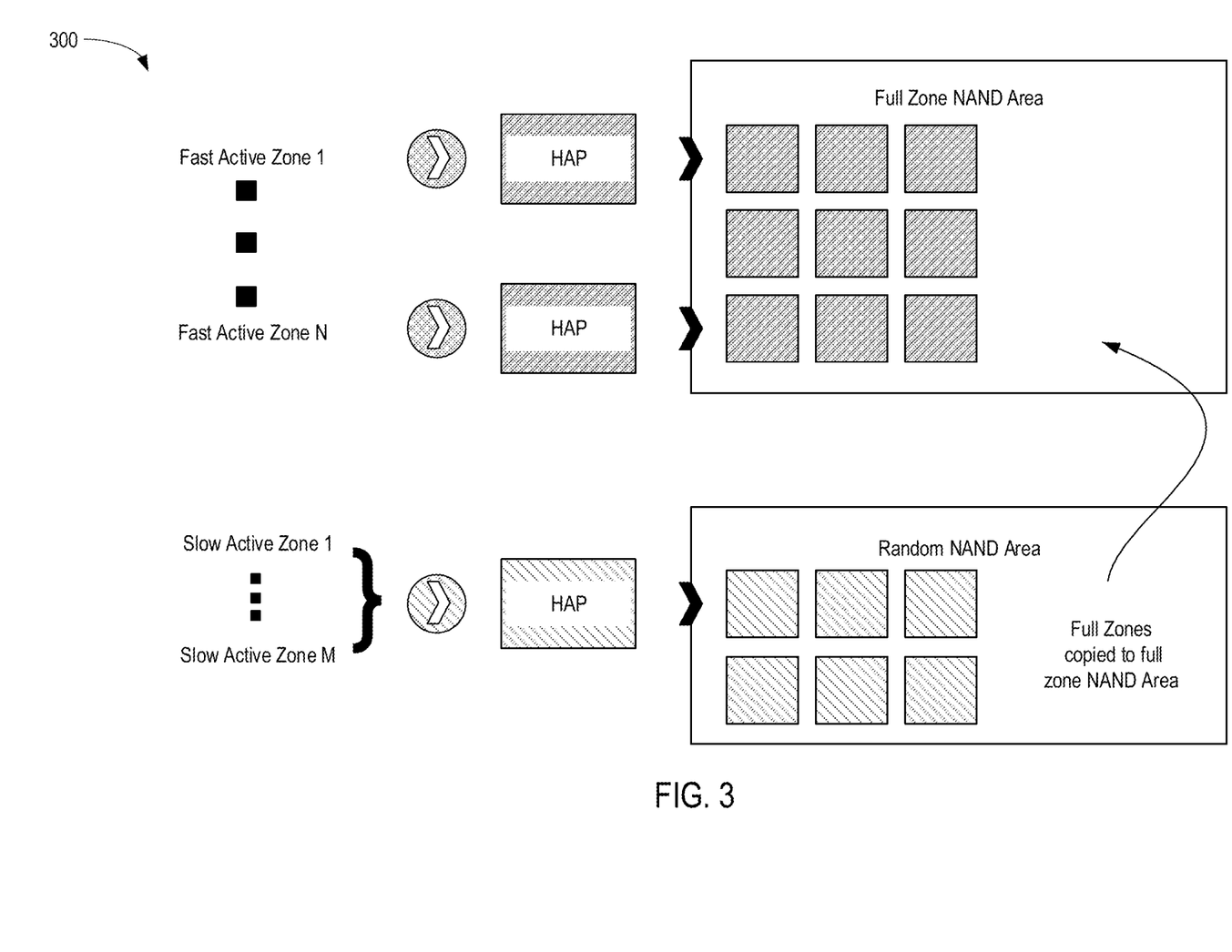
FIG. 3 is a block diagram illustrating a system of caching slow zones, according to one embodiment.

FIG. 3 is a block diagram illustrating a system 300 of caching slow zones, according to one embodiment. In the system 300, when using write rate to increase active zones supported through automatic optimization, the number of open zones on a direct write (e.g., TLC) drive is limited by SRAM buffers and power fail energy. A drive can support more open zones if the drive mixes additional zones into a NAND buffer cache and then sequentially compacts each zone once the zone is full (additional zones are mixed into a dedicated cache HAP instead of having a direct write HAP for each active zone). The HAP is a dedicated set of NAND blocks open for host write.

A problem with this approach is that the device needs an application specific integrated circuit (ASIC) for each full zone and for the random zone. ASIC provides resources for every open zone or every open reclaim unit in the system. Using the ASIC, the controller can track whether an active zone is fast or slow.

For active fast zones, the write commands pass through the HAP and are stored in a full zone NAND area. For the slow active zones, the write commands pass through the HAP and are stored in a random NAND area. Once the slow active zones are completely filled, the controller can copy the full zones from the random NAND area to the full zone NAND area.

Figure 4:
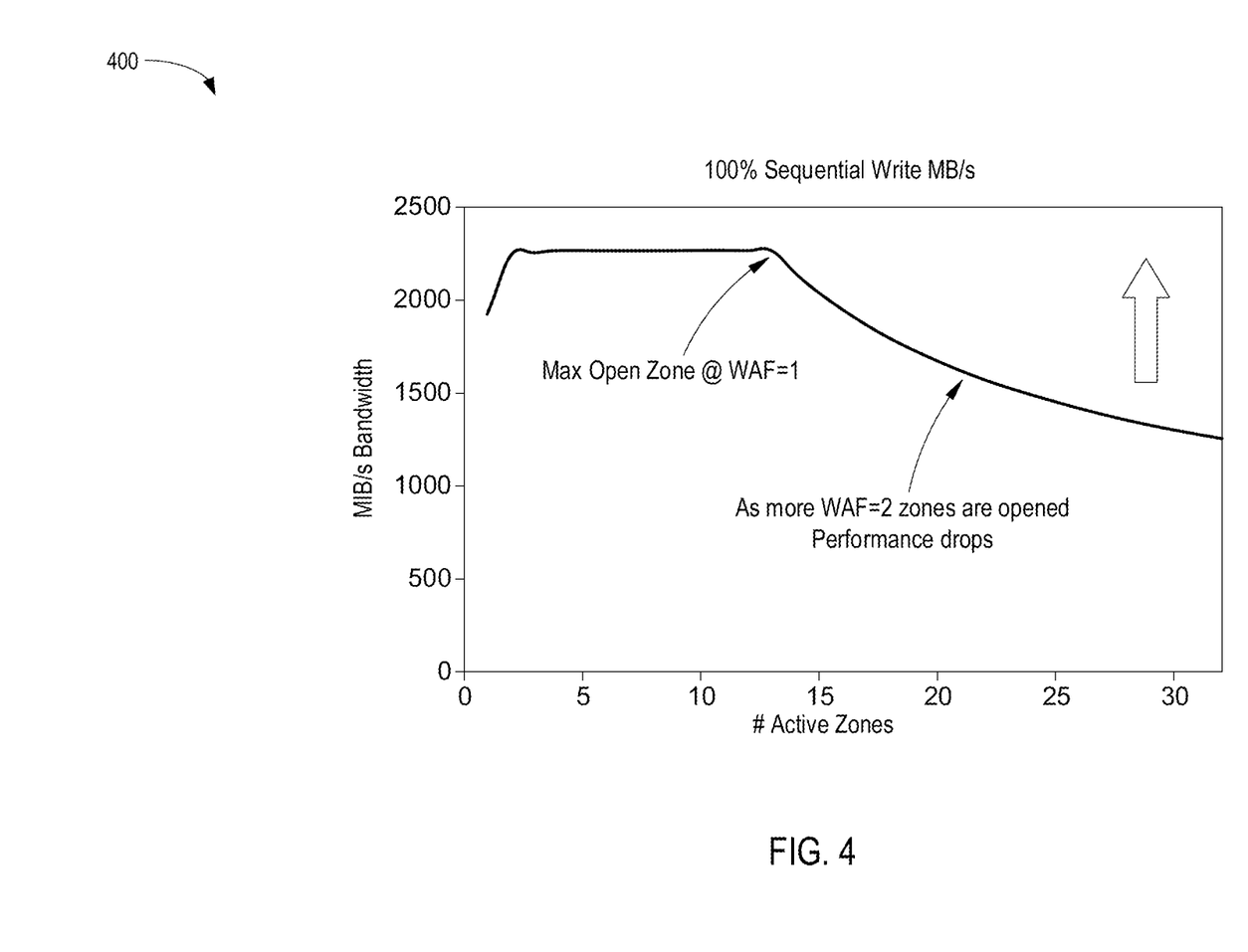
FIG. 4 is a graph illustrating a system for increased zones sequential write performance, according to one embodiment.

FIG. 4 is a graph illustrating a system 400 for increased zone sequential write performance, according to one embodiment. Cached zones have a write amplification factor (WAF)=2 whereas non-cached zones have a WAF=1 in the example of FIG. 4. Since the controller can estimate the likely write rate of each zone as the zone is opened, the controller can choose whether to open the zone as a direct write or NAND cached write.

The slow zones will have a WAF of 2 because the fast zones are so much faster generally than the slow zones. The slow zones are generally just writing metadata, while the fast zones are writing or storing large files such as movies and big blocks of data.

If the controller does not have the system where the controller can tell whether a zone is fast or slow, the controller can allow half of the zones to the random NAND area and then offer the additional half to go to the direct write area.

In the graph of the increased zone sequential write performance, the maximum performance is about 2300 MiB/s. The max open zone at WAF=1 is the maximum number of direct right zones that the ASIC of the device can support. As the direct writes start to increase beyond the point of what the ASIC can support when opening more and more zones, the performance drops. The controller cannot tell which zones are not available to write to because of the full zones are copied over to the full zone NAND area. The slope in FIG. 4 decreases as the active zones become closer to a constant WAF.

Figure 5:
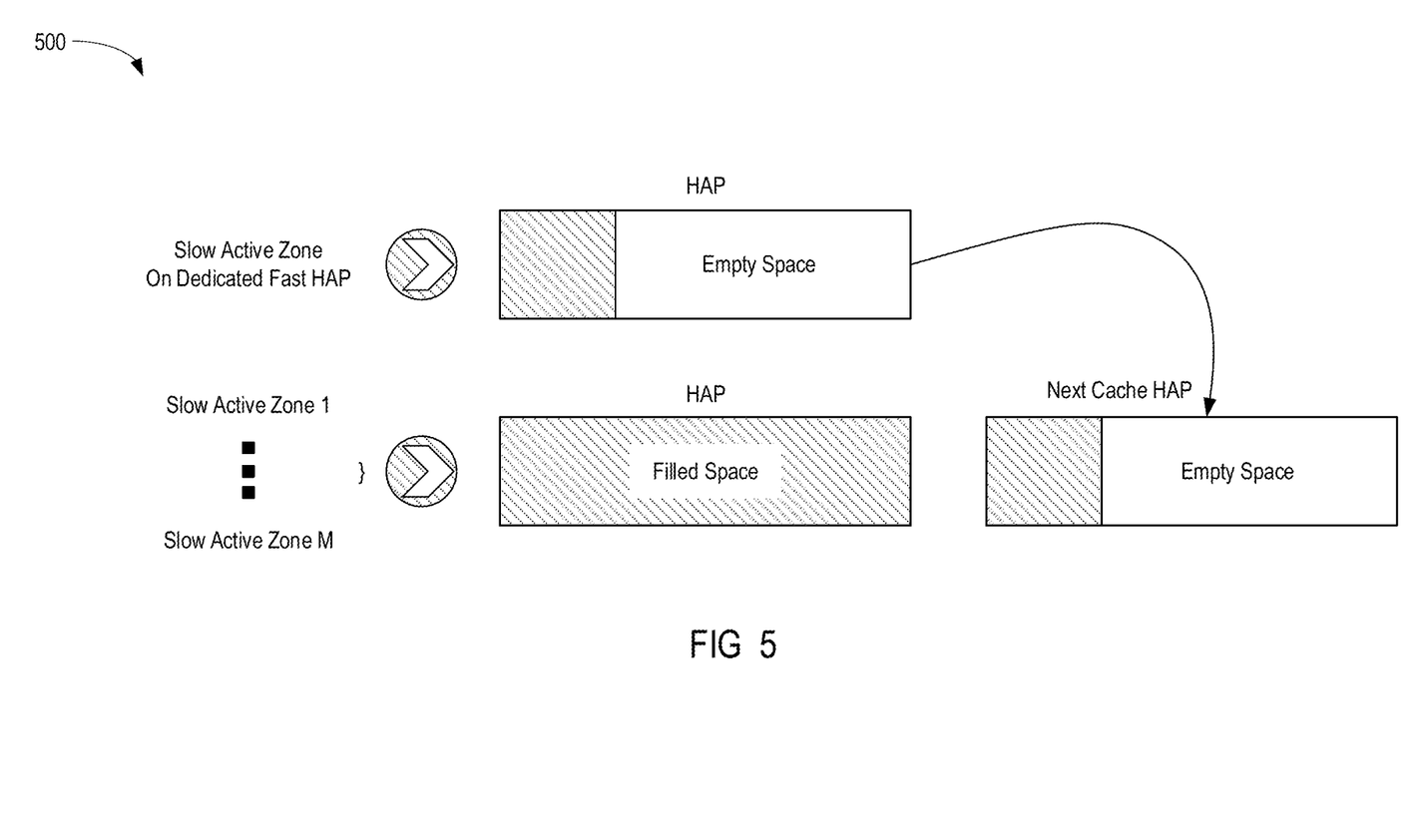
FIG. 5 is a block diagram illustrating a system for reusing HAP for cache HAP, according to certain embodiments.

FIG. 5 is a block diagram illustrating a system 500 for reusing HAP for cache HAP, according to certain embodiments. If a zone is being written fast and the zone is erroneously placed into the NAND cache HAP, the zone won't be in the NAND cache for too long. The zone will likely be sent to a direct write zone on the next open command. If a slow zone is erroneously chosen as a direct write zone, the next time the NAND cache HAP is full the cache HAP can start using the partially full dedicated slow zone HAP as the cache HAP. The resulting filled JD will be placed in the NAND cache pool.

Figure 6:
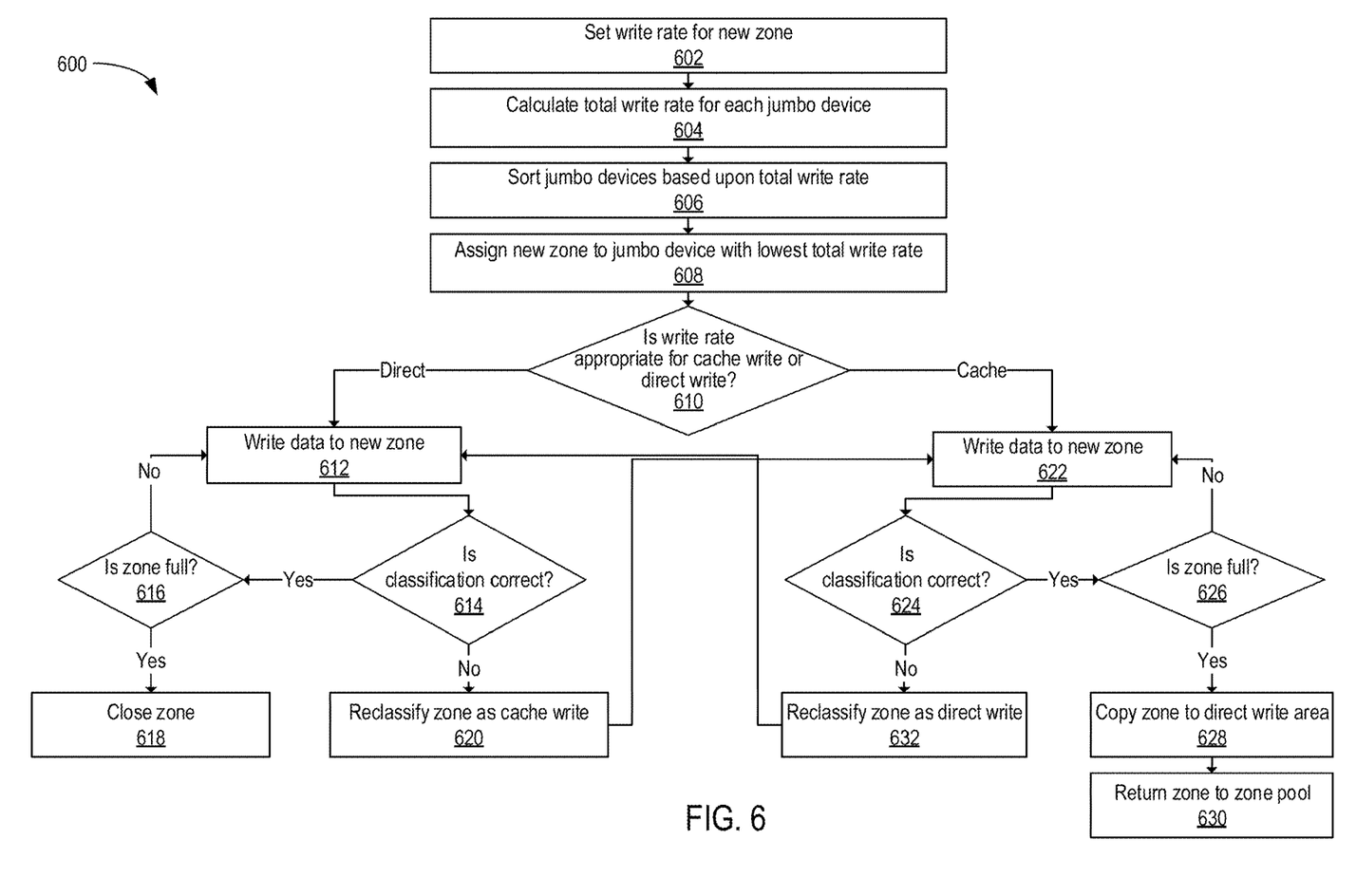
FIG. 6 is a flowchart illustrating a method for cache writing or direct writing a new zone, according to certain embodiments.

FIG. 6 is a flowchart illustrating a method 600 for cache writing or direct writing a new zone, according to certain embodiments. The method 600 begins at block 602. At block 602, the controller sets a write rate for a new zone. At block 604, the controller calculates a total write rate for each JD. At block 606, the controller sorts the JDs based upon the total write rate. At block 608, the controller assigns new zone to the JD with the total lowest write rate. At block 610, the controller determines if the write rate is appropriate for cache or for direct write. If the controller determines that the write rate is appropriate for direct write, then the method 600 proceeds to block 612.

At block 612, the controller writes data to the new zone of a ZNS. A block 614, the controller determines whether the classification is correct. If the classification is correct, then the method 600 proceeds to block 616. At block 616, the controller determines if the new zone is full. If the controller determines that the new zone is not full, then the method 600 returns to block 612. If the controller determines that the new zone is full, then the method 600 proceeds to block 618. At block 618, the zone is closed. If the classification is not correct, then the method 600 proceeds to block 620. At block 620, the controller reclassifies the new zone as cache write and the method 600 proceeds to block 622.

If the controller determines that the write rate is appropriate for cache write, then the method 600 proceeds to block 622. At block 622, the controller writes data to the new zone of a ZNS. A block 624, the controller determines whether the classification is correct. If the classification is correct, then the method 600 proceeds to block 626. At block 626, the controller determines if the new zone is full. If the controller determines that the new zone is not full, then the method 600 returns to block 622. If the controller determines that the new zone is full, then the method 600 proceeds to block 628. At block 628, the controller copies the new zone to the direct write area. At block 630, the controller returns the new zone to the zone pool. If the classification is not correct, then the method 600 proceeds to block 632. At block 632, the controller reclassifies the new zone as direct write and the method 600 proceeds to block 612.

By optimizing caching of non-direct write active zones there are lower costs of supporting more open zones. The optimization increases performance for drives that cache excess zones. The device now has the ability to support smaller zones with XOR (stripe over fewer die). There is an improvement to drive performance with hosts that have non-uniform write rates across zones (the usual case for LSM databases and file systems like BTRFS).

In one embodiment, a data storage device comprises: a memory device; and a controller coupled to the memory device, wherein the controller is configured to: open a zone in a zoned namespace (ZNS) drive, wherein the zone has an estimated write rate equal to the write rate of a most recently closed zone; calculate a total write rate for each jumbo device of a plurality of jumbo devices, wherein each jumbo device includes a plurality of zones; and place the opened zone in a jumbo device having a lowest total write rate. The controller is configured to sort the plurality of jumbo devices based upon total write rates. The controller is configured to determine which die of the memory device to select for opening the zone. The selecting is based upon a fullness of the die. The selected die has a lowest fullness of available dies. The controller is configured to classify the zone as either a direct write zone or a cache write zone. The controller is configured to write metadata to the zone when the zone is classified as a cache write zone. The controller is configured to write user data to the zone when the zone is classified as a direct write zone. A cache write zone has a lower write rate than a direct write zone. The controller is configured to reclassify the zone from being a direct write zone to being a cache write zone.

In another embodiment, a data storage device comprises: a memory device; and a controller coupled to the memory device, wherein the controller is configured to: classify newly opened zones based upon write rate, wherein the classifying comprises placing the newly opened zones into either a direct write classification or a cache write classification; write data to the newly opened zones; determine that at least one zone of the newly opened zones is misclassified; close another zone; and reclassify the at least one zone. The determining comprises determining that the at least one zone is misclassified as a direct write zone. The another zone is classified as a cache write zone. Zones in a direct write classification have a higher write rate than zones in a cache write classification. The controller is configured to rewrite data from a zone classified as a cache write zone to a zone classified as a direct write zone. The determining comprises determining that the at least one zone is misclassified as a cache write zone, and wherein the another zone is classified as a direct write zone. The controller is configured to assign an estimated write rate to the newly opened zones and wherein the estimated write rate is equal to an actual write rate of a most recently closed zone.

In another embodiment, a data storage device comprises: means to store data; and a controller coupled to the means to store data, wherein the controller is configured to: estimate a write rate for newly opened zones; categorize the newly opened zones based upon the write rate; analyze correctness of the categorizing after beginning a write process; and re-categorize the newly opened zones after beginning the write process and before filling the newly opened zones. The estimating comprises estimating the write rate to be equal to a write rate of a most recently closed zone. The controller is configured to: calculate a total write rate for each jumbo device of a plurality of jumbo devices, wherein each jumbo device includes a plurality of zones; and place the opened zone in a jumbo device having a lowest total write rate.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, wherein the controller is configured to:
     open a zone in a zoned namespace (ZNS) drive, wherein the zone has an estimated write rate equal to the write rate of a most recently closed zone;
     calculate a total write rate for each jumbo device of a plurality of jumbo devices, wherein each jumbo device includes a plurality of zones; and
     place the opened zone in a jumbo device having a lowest total write rate.

2. The data storage device of claim 1, wherein the controller is configured to sort the plurality of jumbo devices based upon total write rates.

3. The data storage device of claim 1, wherein the controller is configured to determine which die of the memory device to select for opening the zone.

4. The data storage device of claim 3, wherein the selecting is based upon a fullness of the die.

5. The data storage device of claim 4, wherein the selected die has a lowest fullness of available dies.

6. The data storage device of claim 1, wherein the controller is configured to classify the zone as either a direct write zone or a cache write zone.

7. The data storage device of claim 6, wherein the controller is configured to write metadata to the zone when the zone is classified as a cache write zone.

8. The data storage device of claim 6, wherein the controller is configured to write user data to the zone when the zone is classified as a direct write zone.

9. The data storage device of claim 6, wherein a cache write zone has a lower write rate than a direct write zone.

10. The data storage device of claim 6, wherein the controller is configured to reclassify the zone from being a direct write zone to being a cache write zone.

11. A data storage device, comprising:
    a memory device; and
    a controller coupled to the memory device, wherein the controller is configured to:
      classify newly opened zones based upon write rate, wherein the classifying comprises placing the newly opened zones into either a direct write classification or a cache write classification;
      write data to the newly opened zones;
      determine that at least one zone of the newly opened zones is misclassified;
      close another zone; and
      reclassify the at least one zone.

12. The data storage device of claim 11, wherein the determining comprises determining that the at least one zone is misclassified as a direct write zone.

13. The data storage device of claim 12, wherein the another zone is classified as a cache write zone.

14. The data storage device of claim 12, wherein zones in a direct write classification have a higher write rate than zones in a cache write classification.

15. The data storage device of claim 11, wherein the controller is configured to rewrite data from a zone classified as a cache write zone to a zone classified as a direct write zone.

16. The data storage device of claim 11, wherein the determining comprises determining that the at least one zone is misclassified as a cache write zone, and wherein the another zone is classified as a direct write zone.

17. The data storage device of claim 11, wherein the controller is configured to assign an estimated write rate to the newly opened zones and wherein the estimated write rate is equal to an actual write rate of a most recently closed zone.

18. A data storage device, comprising:
    means to store data; and
    a controller coupled to the means to store data, wherein the controller is configured to:
      estimate a write rate for newly opened zones;
      categorize the newly opened zones based upon the write rate;
      analyze correctness of the categorizing after beginning a write process; and
      re-categorize the newly opened zones after beginning the write process and before filling the newly opened zones.

19. The data storage device of claim 18, wherein the estimating comprises estimating the write rate to be equal to a write rate of a most recently closed zone.

20. The data storage device of claim 18, wherein the controller is configured to:
    calculate a total write rate for each jumbo device of a plurality of jumbo devices, wherein each jumbo device includes a plurality of zones; and
    place the opened zone in a jumbo device having a lowest total write rate.

* * * * *